(12) United States Patent
Huang et al.

(10) Patent No.: US 12,067,864 B2
(45) Date of Patent: Aug. 20, 2024

(54) METHOD FOR QUICKLY DETERMINING MIXED TRAFFIC CONFLICT SITUATION

(71) Applicant: SOUTH CHINA UNIVERSITY OF TECHNOLOGY, Guangdong (CN)

(72) Inventors: Ling Huang, Guangzhou (CN); Hengcong Guo, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 909 days.

(21) Appl. No.: 17/256,021

(22) PCT Filed: Oct. 22, 2018

(86) PCT No.: PCT/CN2018/111210
§ 371 (c)(1),
(2) Date: Dec. 24, 2020

(87) PCT Pub. No.: WO2020/000794
PCT Pub. Date: Jan. 2, 2020

(65) Prior Publication Data
US 2021/0174670 A1    Jun. 10, 2021

(30) Foreign Application Priority Data
Jun. 27, 2018 (CN) .......................... 201810677570.2

(51) Int. Cl.
*G08G 1/01*    (2006.01)
*G06V 20/52*    (2022.01)

(52) U.S. Cl.
CPC .......... *G08G 1/0116* (2013.01); *G06V 20/52* (2022.01); *G08G 1/0133* (2013.01); *G08G 1/0141* (2013.01); *G08G 1/0145* (2013.01)

(58) Field of Classification Search
CPC .. G08G 1/0116; G08G 1/0133; G08G 1/0141; G08G 1/0145; G08G 1/04;
(Continued)

(56) References Cited

U.S. PATENT DOCUMENTS 6,662,141 B2    12/2003   Kaub
2018/0307239 A1*  10/2018  Shalev-Shwartz ... G05D 1/0055
(Continued)

FOREIGN PATENT DOCUMENTS

CN        101853575        10/2010
CN        101853575 A    *  10/2010
(Continued)

*Primary Examiner* — Harry Y Oh
(74) *Attorney, Agent, or Firm* — JMB DAVIS BEN-DAVID

(57) ABSTRACT

The present invention discloses a method for rapid determining a situation of mixed traffic conflicts, which is used in the field of traffic management, including identifying each of traffic individual units in the road section to be detected, calculating a movement distance of the traffic individual units within the reaction time, and obtaining critical conflict areas for vehicles and pedestrians. Then by obtaining intersections of critical conflict areas to finally obtain potential traffic conflict areas. Compared with the previous traffic conflict determination technology, it has strong operability, many applicable objects, wide application range, intuitive and visible results, and practical promotion value.

10 Claims, 5 Drawing Sheets

(58) Field of Classification Search
CPC ........ G08G 1/164; G08G 1/0104; G08G 1/16; G08G 1/01; G06F 18/213; G06V 20/52; H04W 4/026; H04W 4/027
See application file for complete search history.

(56) References Cited

U.S. PATENT DOCUMENTS

2018/0307240 A1* 10/2018 Shalev-Shwartz ........................... B60W 30/0956
2018/0314266 A1* 11/2018 Shalev-Shwartz ..... G01C 21/34
2019/0377354 A1* 12/2019 Shalev-Shwartz ........................... B60W 30/0956

FOREIGN PATENT DOCUMENTS

| CN | 102592441 | | 7/2012 | |
|---|---|---|---|---|
| CN | 102592448 | | 7/2012 | |
| CN | 103093622 | | 5/2013 | |
| CN | 105070051 | | 11/2015 | |
| CN | 105070096 | | 11/2015 | |
| CN | 106875747 | | 6/2017 | |
| CN | 107705635 | | 2/2018 | |
| CN | 108922176 A | * | 11/2018 | ........... G06K 9/6232 |
| CN | 108922176 B | * | 5/2021 | ........... G06K 9/6232 |
| CN | 108417087 B | * | 9/2021 | ........ B60W 30/0956 |

* cited by examiner

METHOD FOR QUICKLY DETERMINING MIXED TRAFFIC CONFLICT SITUATION

CROSS-REFERENCE TO RELATED APPLICATIONS

This is the U.S. National Stage of International Patent Application No. PCT/CN2018/111210 filed on Oct. 22, 2018, which in turn claims the benefit of Chinese Patent Application No. 201810677570.2 filed on Jun. 27, 2018.

TECHNICAL FIELD

The invention relates to the field of traffic management, in particular to a method for rapid determining a situation of mixed traffic conflicts.

TECHNICAL BACKGROUND

In recent years, with the rapid development of science and technology and the rise of new business models, shared economy models represented by shared bicycles, shared cars, and shared scooters have entered the transportation industry, aiming to solve the transportation problems of urban residents. While the prosperity of the shared economy has brought many conveniences to urban transportation, it has also brought more new requirements and challenges to traffic management technology. At the same time, the same development trend has emerged in the traffic environment locally and abroad: diversifying types of traffic individual units, the traffic environment is becoming more complex and the number of non-motor vehicles is increasing. Combining the complex composition of current urban traffic in this country and national conditions of road traffic with a high concentration of various unsafe factors, the current traffic safety evaluation methods are already unable to meet the needs of traffic professionals to rapid evaluate road traffic safety.

The current traffic safety evaluation methods are mainly divided into two categories: traffic safety evaluation methods based on accident statistics and indirect evaluation methods based on non-accident statistics.

Traffic safety evaluation methods based on accident statistics have deficiencies such as long evaluation cycles, inaccurate evaluation results due to imperfect statistical work, unreliable evaluation results due to the randomness of accidents, and irreversibility of accidents making it difficult to analyze the causes of accidents. Therefore, there are huge deficiencies in actual use. The indirect evaluation methods based on non-accident statistics establishes a traffic safety evaluation method based on influencing factors by analyzing the relationship between various factors in the traffic system. Traffic conflict technology is the most typical method of indirect evaluation methods based on non-accident statistics.

The existing traffic conflict determination technology has the following two deficiencies:

(1) The determination targets are single-type. In the existing traffic conflict determination technology, most of them can only determine traffic conflict targets on single-type traffic individual units. In typical traffic scenes, there are often different types of traffic individual units comprising motor vehicles, electric bicycles, bicycles, pedestrians etc., and a single-type determination method is impractical.

(2) The calculation method is complicated. In the existing traffic conflict determination methods, there are many models with extremely high accuracy, but the amount of calculation is extremely large, and the statistical models involved are too complicated to be mastered by ordinary traffic managers. Even if the technology is mastered, it takes a lot of time and energy to calculate, which is time-consuming and laborious, but the input is not proportional to the output, and the efficiency is low.

SUMMARY OF THE INVENTION

In order to overcome the deficiencies and shortcomings of the prior art, the present invention provides a method for rapid determining a situation of mixed traffic conflicts.

The present invention adopts the following technical solutions:

As shown in FIG. 1, a method for rapid determining a situation of mixed traffic conflicts, comprising the following steps:

S1 identifying each of traffic individual units in a road section to be detected, the traffic individual units comprises motor vehicles, non-motor vehicles and pedestrians;

S2 obtaining static feature information and dynamic feature information of all traffic individual units within a video detection range, and separating all traffic individual units into two groups: vehicles and pedestrians;

the static feature information of the traffic individual units in S2 comprises a type, a length and an occupied space area of the traffic individual units;

the dynamic feature information comprises position information, a speed and a movement direction.

S3 calculating a movement distance of each of the traffic individual units within a reaction time $t_r$ according to a current speed (denoted as S), using different critical conflict area models to control to fit a critical conflict area according to the different traffic characteristics of vehicles and pedestrians.

The step of calculating a movement distance of the traffic individual units within a reaction time $t_r$ in S3 is specifically as follows:

assuming that during the reaction time, a moving speed of the traffic individual units remains unchanged, the movement distance S of the individual traffic unit is:

$$S = v \times t_r$$

v—the moving speed of the traffic individual units;
$t_r$—the reaction time of traffic individual units, values between 1 to 1.5 s.

For the critical conflict areas of vehicle-type traffic individual units, the direction of movement may not have an immediate change in a short time. Specifically using a center of the traffic individual units as a coordinate origin to establish a Cartesian coordinate system, and fitting a boundary of the critical conflict areas to satisfy an ellipse formula:

$$\frac{(x - 0.5S - 0.25l)^2}{0.25(S + 0.5l)^2} + \frac{y^2}{(0.64S + 0.5l)^2} = 1$$

S—the movement distance of the traffic individual units;
l—a length of the traffic individual units;
x, y—x and y axis coordinates of an ellipse equation.

Pedestrian traffic individual units exhibit different traffic characteristics from vehicle-type traffic individual units in a complex traffic environment. Pedestrian walking speed changes fast and frequently. Pedestrian walking action is simple and straightforward, so may change speed with high frequency and rapid speed to adapt to different road conditions. For pedestrians: critical conflict areas based on a movement distance of the pedestrians as a radius, and the pedestrians as the center of a circle, to fit a boundary of the critical conflict areas of the pedestrians, a specific formula is as follows:

$$x^2+y^2=S^2$$

where S is the movement distance of the traffic individual units; x, y are x and y axis coordinates of a circle equation.

S4 obtaining intersections of connected conflict areas of each of the traffic individual units, removing intersections of critical conflict areas between the pedestrians. Because the pedestrian walking speed changes fast, and changes frequently, the cooperative behavior with other pedestrians has the following two characteristics:
(1) Mutually exclusive feature: When pedestrians have a walking route conflict, they will show a certain degree of comity and avoidance, and choose a new route;
(2) Part of a group feature: When multiple people with the same destination walk, pedestrians tend to gather in a group to walk together. The above two features determine that under normal walking conditions, conflicts between pedestrians are not easy to occur and the damage is extremely limited. Therefore, intersections of critical conflict areas between pedestrians are eliminated to reduce the amount of system calculations to achieve the purpose of rapid determination.

The intersections of the remaining critical conflict areas are set as potential traffic conflict areas, and the traffic individual units with intersections are determined as traffic conflict individuals;

S5 calculating from geometric knowledge to obtain the area $D_C$ of the critical conflict areas and the unweighted area D of potential traffic conflict areas of each of traffic conflict individuals, and then according to the angle θ between the potential traffic conflict areas and the traffic conflict object, θ is −180°≤θ≤180°, counterclockwise is the positive direction, as shown in FIG. 7, calculating the weighted area of the potential traffic conflict areas, and finally calculating the conflict coefficients E of the individuals from the weighted area and the area of the critical conflict area.

The step of calculating weighted areas of the potential traffic conflict areas in S5 is:

$$D_T = \frac{9}{2\pi^3} \int\int D \times e^{\frac{9(\theta_1^2 + \theta_2^2)}{2\pi^2}} d\theta_1 d\theta_2$$

D—unweighted areas of the potential traffic conflict areas;
$\theta_1$—an angle between a traffic conflict location and a forward direction of a conflict object 1;
$\theta_2$—an angle between a traffic conflict location and a forward direction of a conflict object 2.

A calculation of the conflict coefficients of traffic individual units in S5 is specifically:

$$\varepsilon = \frac{D_T}{D_C} \times 100\%$$

ε—the conflict coefficients of traffic individual units;
$D_T$—the area of the potential traffic conflict areas;
$D_C$—the area of the critical conflict areas.

S6 allocating safety levels of the traffic conflict individuals according to the conflict coefficients.
when 0<ε≤10, the safety level is I, with slight safety risks, and a label color is blue;
when 10<ε≤30, the safety level is II, with moderate safety risks, and a label color is yellow;
when 10<ε≤30, the safety level is III, with serious safety risks, and a label color is orange;
when 50<ε, the safety level is IV, with great safety risks, and a label color is red.

The beneficial effects of the present invention:
(1) Strong operability. The present invention uses a simple geometric model to fit critical conflict areas of different types of traffic individual units. The method is simple and efficient, and the operability is strong.
(2) There are many applicable objects. The present invention can be applied to various traffic individual units such as motor vehicles, bicycles and other non-motor vehicles, pedestrians etc., and has more applicable objects than the previous traffic conflict technology.
(3) Wide application range. The present invention is suitable for traffic conflict detection on any road section, and is not limited to special traffic environments such as traffic light intersections, and the method has universal applicability.
(4) Visualization of results. The conflict study and determination results of the present invention are marked by the color safety levels, and the result is intuitive and visible.

DESCRIPTIONS

The following describes the present invention in further detail with reference to the embodiments and the figures, but the embodiments of the present invention are not limited thereto.

EMBODIMENTS

Figure 1:
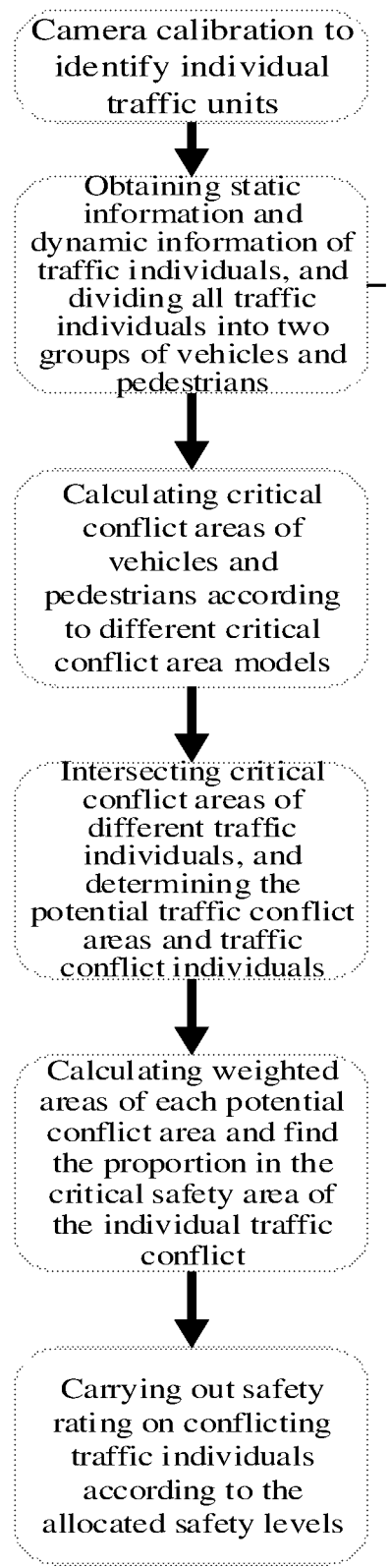
FIG. 1 is an operating flow chart of the present invention.
Figure 2:
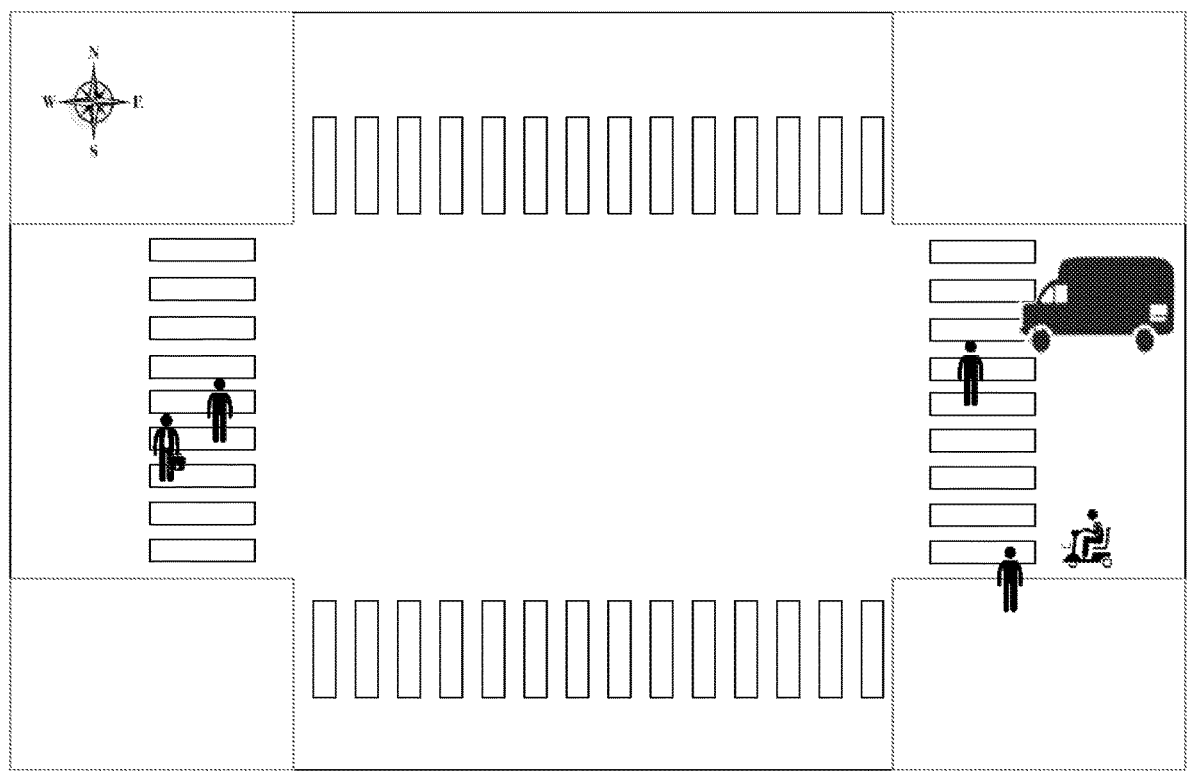
FIG. 2 is an illustrative diagram of traffic on a road section to be detected according to an embodiment of the present invention.
Figure 3:
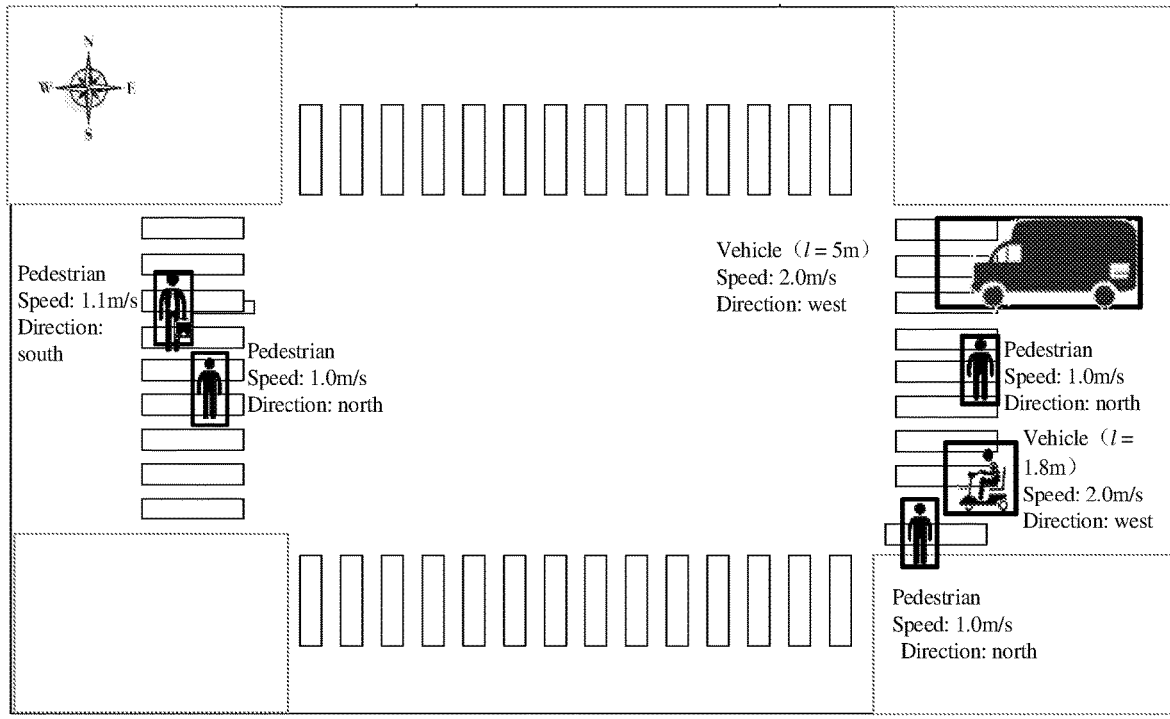
FIG. 3 is an illustrative diagram of information of an individual traffic unit according to an embodiment of the present invention.

A method for rapid determining a situation of mixed traffic conflicts, comprising the following steps:
S1 setting a surveillance camera on a road section to be detected, after the camera is calibrated, inputting the picture or video of the road section to be detected into a computer, and identifying each of traffic individual units on the road section to be detected after processing, the traffic individual units comprises motor vehicles, non-motor vehicles and pedestrians, as shown in FIG. 2;
S2 obtaining static feature information and dynamic feature information of all traffic individual units within a video detection range, and separating all traffic individual units into two groups of vehicles and pedestrians, as shown in FIG. 3;

The static feature information comprises a type, a length and an occupied space area etc. of the traffic individual units; the dynamic feature information comprises position information, a speed and a movement direction etc.

Figure 4:
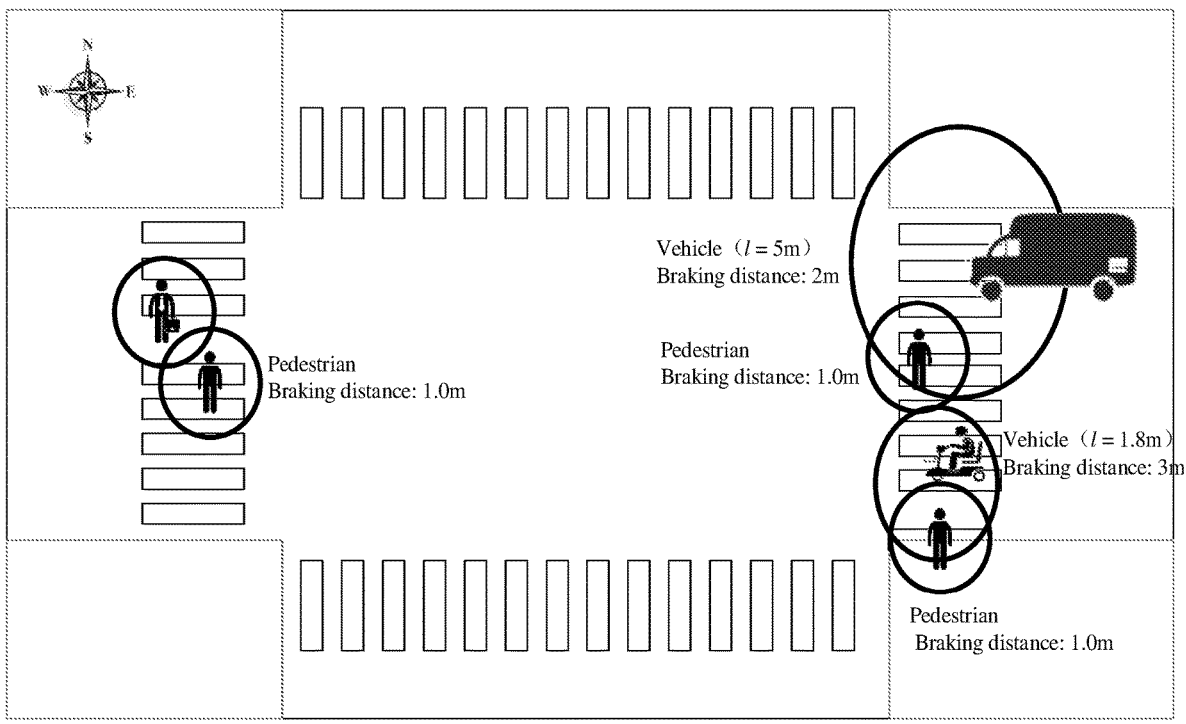
FIG. 4 is an illustrative diagram of fitting a movement distance of traffic individual units and critical conflict areas according to an embodiment of the present invention.

S3 calculating a movement distance of the traffic individual units within a reaction time $t_r$ according to the current speed of the traffic individual units, and obtaining critical conflict areas of each of the traffic individual units according to traffic characteristics of the vehicles and the pedestrians; As shown in FIG. 4, the reaction time $t_r=1.0$ s in this embodiment.

For vehicles, the following formula is used to fit the critical conflict areas:

$$\frac{(x-0.5S-0.25l)^2}{0.25(S+0.5l)^2} + \frac{y^2}{(0.64S+0.5l)^2} = 1$$

S—the movement distance of the traffic individual units;
l—a length of the traffic individual units;

For pedestrians, use the formula to fit critical conflict areas $$x^2+y^2=S^2$$

where S is the movement distance of the traffic individual units.

Finally, the movement distance of each individual traffic unit on the road section and the fitting of the critical conflict areas are obtained as shown in FIG. 4.

Figure 5:
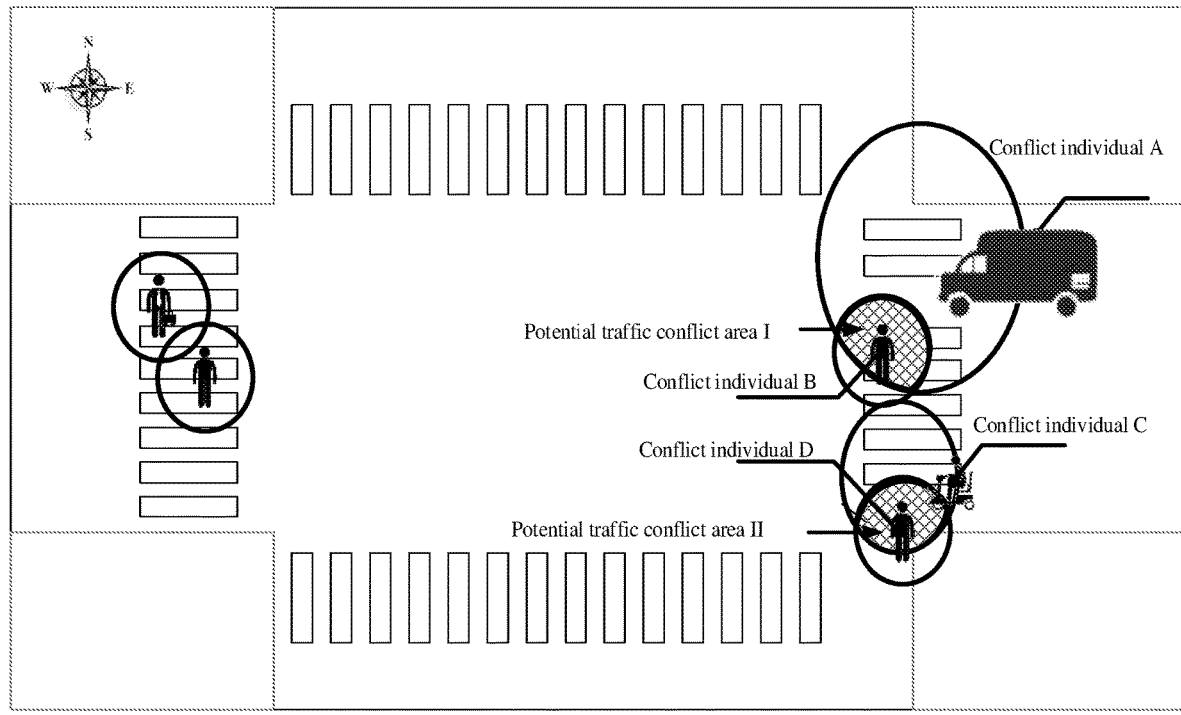
FIG. 5 is an illustrative diagram of determining potential traffic conflict areas and traffic individuals according to an embodiment of the present invention.

S4 obtaining intersections of connected conflict areas of each of the traffic individual units, removing critical conflict areas between the pedestrians, setting intersections of remaining critical conflict areas as potential traffic conflict areas, determining traffic individual units that have intersections as traffic conflict individuals; The determination of the traffic conflict objects and the potential traffic conflict areas on this road section is shown in FIG. 5.

Figure 6:
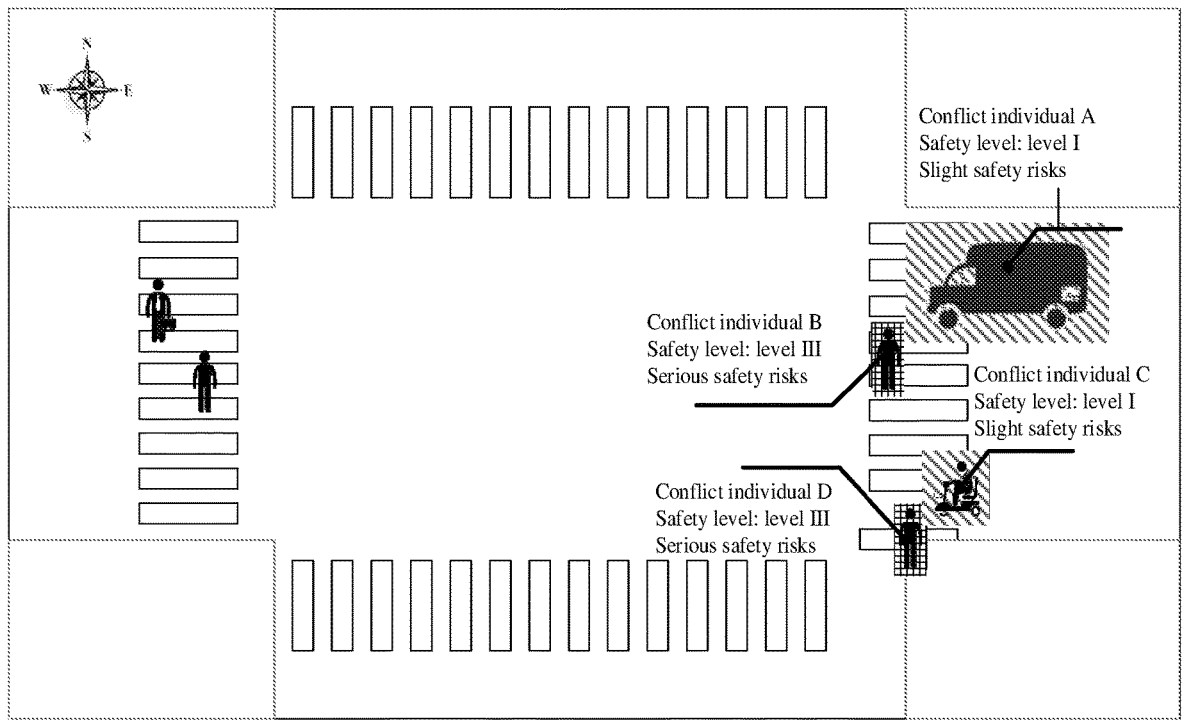
FIG. 6 is an illustrative diagram of a security level identification according to an embodiment of the present invention.
Figure 7:
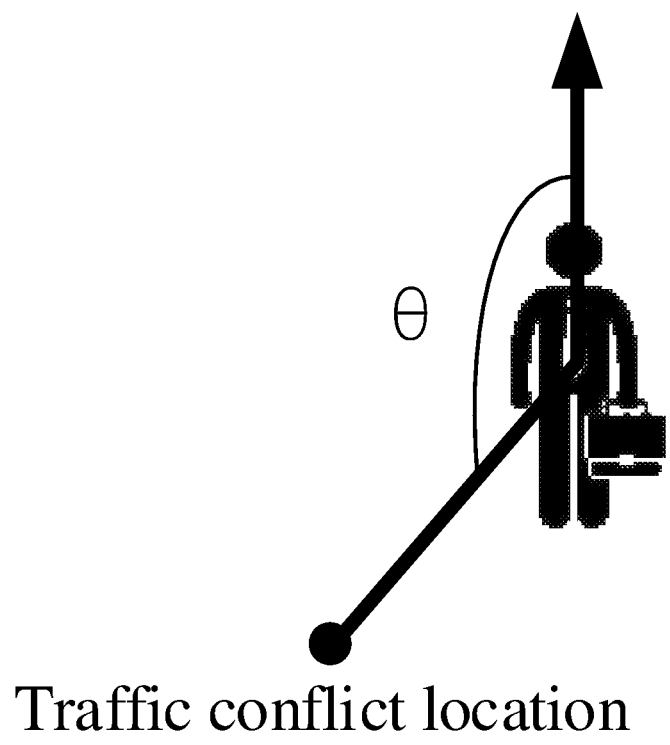
FIG. 7 is an illustrative diagram of marking the angle θ of the present invention.

S5 From step S4, it can be obtained that the road section has potential traffic conflict area I, potential traffic conflict area II, and the traffic individual units involved have traffic conflict objects A\B\C\D, which can be calculated by geometric methods:

The unweighted area of potential traffic conflict area I is $D_1=2.1$ m$^2$
The unweighted area of potential traffic conflict area II is $D_2=1.9$ m$^2$
The critical conflict area of traffic conflict object A is $D_A=26.6$ m$^2$
The critical conflict area of traffic conflict object B is $D_B=3.14$ m$^2$
The critical conflict area of traffic conflict object C is $D_C=9.8$ m$^2$
The critical conflict area of traffic conflict object D is $D_D=3.14$ m$^2$ Then the weighted area formula calculates to obtain:
The weighted area of potential traffic conflict area I is $D_{T1}=0.95$ m$^2$
The weighted area of potential traffic conflict area II is $D_{T2}=0.95$ m$^2$ S6 as shown in FIG. 6, the conflict coefficients of each of traffic conflict individual units can be calculated from the conflict coefficient formula, as shown in Table 1 below.

TABLE 1

| Traffic Conflict Individuals | ε/% | Safety Level | Description |
| --- | --- | --- | --- |
| A | 3.5 | Level I | slight safety risks |
| B | 30.25 | Level III | serious safety risks |
| C | 9.6 | Level I | slight safety risks |
| D | 30.25 | Level III | serious safety risks |

The above described embodiments are preferred embodiments of the present invention, but the embodiments of the present invention are not limited by the above embodiments, and any other changes, modifications, substitutions, combinations and simplifications made without departing from the spirit and principle of the present invention should be equivalent replacement methods, and they are all included in the protection scope of the present invention.

The invention claimed is:

1. A computer-implemented method for rapid determining a situation of mixed traffic conflicts, characterized in that, the method comprising the following steps:

identifying, by a computing device, each of traffic individual units in a road section to be detected by a video camera, the traffic individual units comprises motor vehicles, non-motor vehicles and pedestrians;

obtaining static feature information and dynamic feature information of all traffic individual units within a video detection range, and separating all traffic individual units into two groups of vehicles and pedestrians, by the computing device;

calculating a movement distance of the traffic individual units within a reaction time $t_r$ according to a current speed of the traffic individual units, and obtaining critical conflict areas of each of the traffic individual units according to traffic characteristics of the vehicles and the pedestrians, by the computing device;

obtaining intersections of connected conflict areas of each of the traffic individual units, removing intersections of critical conflict areas between the pedestrians, setting intersections of remaining critical conflict areas as potential traffic conflict areas, determining traffic individual units that have intersections in the potential traffic conflict areas as traffic conflict individuals, by the computing device;

calculating an area $D_C$ of the critical conflict areas and an unweighted area D of the potential traffic conflict areas of each of the traffic individual units, and then calculating weighted areas of the potential traffic conflict areas, obtaining conflict coefficients ε of the traffic individual units from the area of the critical conflict areas and the weighted areas, by the computing device;

allocating, by the computing device, safety levels of the traffic conflict individuals according to the conflict coefficients.

2. The computer-implemented method for rapid determining according to claim 1, characterized in that, the static feature information of the traffic individual units comprises a type, a length and an occupied space area of the traffic individual units;

the dynamic feature information comprises position information, a speed and a movement direction.

3. The computer-implemented method for rapid determining according to claim 1, characterized in that, the step of calculating a movement distance of the traffic individual units within a reaction time $t_r$ is specifically as follows:

assuming that during the reaction time, a moving speed of the traffic individual units remains unchanged, the movement distance S of the individual traffic unit is:

$$S = v \times t_r$$

v—the moving speed of the traffic individual units;
$t_r$—the reaction time of traffic individual units.

4. The computer-implemented method for rapid determining according to claim 1, characterized in that, an ellipse is used to fit the critical conflict areas of vehicle-type traffic individual units, specifically using a center of the traffic individual units as a coordinate origin to establish a Cartesian coordinate system, and fitting a boundary of the critical conflict areas to satisfy an ellipse formula:

$$\frac{(x - 0.5S - 0.25l)^2}{0.25(S + 0.5l)^2} + \frac{y^2}{(0.64S + 0.5l)^2} = 1$$

S—the movement distance of the traffic individual units;
l—a length of the traffic individual units;
x, y—x and y axis coordinates of an ellipse equation.

5. The computer-implemented method for rapid determining according to claim 1, characterized in that, the critical conflict areas of the traffic individual units is based on a movement distance of the pedestrians as a radius, and the pedestrians as the center of a circle, to fit a boundary of the critical conflict areas of the pedestrians, a specific formula is as follows:

$$x^2 + y^2 = S^2$$

where S is the movement distance of the traffic individual units within the reaction time; x, y are x and y axis coordinates of a circle equation.

6. The computer-implemented method for rapid determining according to claim 1, characterized in that, the step of calculating weighted areas of the potential traffic conflict areas is:

$$D_T = \frac{9}{2\pi^3} \int\int D \times e^{\frac{9(\theta_1^2 + \theta_2^2)}{2\pi^2}} d\theta_1 d\theta_2$$

D—unweighted areas of the potential traffic conflict areas;
$\theta_1$—an angle between a traffic conflict location and a forward direction of a conflict object 1;
$\theta_2$—an angle between a traffic conflict location and a forward direction of a conflict object 2.

7. The computer-implemented method for rapid determining according to claim 6, characterized in that, θ is an angle between a traffic conflict location and a forward direction of a traffic conflict object, θ is −180°≤θ≤180°, and counter-clockwise is the positive direction.

8. The computer-implemented method for rapid determining according to claim 1, characterized in that, a calculation of the conflict coefficients of traffic individual units is specifically:

$$\varepsilon = \frac{D_T}{D_C} \times 100\%$$

ε—the conflict coefficients of traffic individual units;
$D_T$—the area of the potential traffic conflict areas;
$D_C$—the area of the critical conflict areas.

9. The computer-implemented method for rapid determining according to claim 1, characterized in that,
when 0<ε≤10, the safety level is I, with slight safety risks, and a label color is blue;
when 10<ε≤30, the safety level is II, with moderate safety risks, and a label color is yellow;
when 10<ε≤30, the safety level is III, with serious safety risks, and a label color is orange;
when 50<ε, the safety level is IV, with great safety risks, and a label color is red.

10. The computer-implemented method for rapid determining according to claim 1, characterized in that, the reaction time is 1 to 1.5 s.

* * * * *